United States Patent
Willis et al.

(10) Patent No.: US 8,824,068 B2
(45) Date of Patent: Sep. 2, 2014

(54) RAPID OPTICAL ASSEMBLY VIA SIMULTANEOUS PASSIVE BONDING

(75) Inventors: Chris L. Willis, Hollis, NH (US); John C. McCarthy, Newmarket, NH (US); Katherine J. Snell, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 3 days.

(21) Appl. No.: 13/809,513

(22) PCT Filed: Apr. 11, 2012

(86) PCT No.: PCT/US2012/032961
§ 371 (c)(1),
(2), (4) Date: Jan. 10, 2013

(87) PCT Pub. No.: WO2012/148662
PCT Pub. Date: Nov. 1, 2012

(65) Prior Publication Data
US 2013/0163103 A1 Jun. 27, 2013

Related U.S. Application Data

(66) Substitute for application No. 61/481,053, filed on Apr. 29, 2011.

(51) Int. Cl.
G02B 7/02 (2006.01)
G02B 7/00 (2006.01)

(52) U.S. Cl.
CPC . *G02B 7/02* (2013.01); *G02B 7/003* (2013.01)
USPC ............ 359/811; 359/819; 359/822; 353/119

(58) Field of Classification Search
USPC .................... 359/811, 819, 822; 348/E9.027, 348/E9.028; 33/503, 559; 228/245, 246, 228/180.21; 353/100, 101, 119; 156/293; 29/525.01
See application file for complete search history.

(56) References Cited

U.S. PATENT DOCUMENTS

| | | | |
|---|---|---|---|
| 5,017,056 A * | 5/1991 | Morash | 408/1 R |
| 6,467,680 B1 * | 10/2002 | O'Connor et al. | 228/245 |
| 6,543,114 B2 * | 4/2003 | Atia et al. | 29/407.04 |
| 6,625,372 B1 | 9/2003 | Flanders et al. | |
| 6,925,233 B2 * | 8/2005 | Inui et al. | 385/39 |
| 7,046,461 B2 * | 5/2006 | Yamaguchi et al. | 359/819 |
| 7,124,928 B2 * | 10/2006 | Conover et al. | 228/103 |
| 7,152,982 B2 * | 12/2006 | Kitabayashi et al. | 353/119 |
| 7,303,644 B2 * | 12/2007 | Kitabayashi et al. | 156/293 |

(Continued)

*Primary Examiner* — Loha Ben
(74) *Attorney, Agent, or Firm* — Finch & Maloney PLLC; Neil F. Maloney; Daniel J. Long

(57) ABSTRACT

Techniques are disclosed for fabricating optical instrumentation. The techniques can be used, for instance, to populate an optical bench with several optics that can be simultaneously bonded and simultaneously verified to precise assembly, and without the use of adjustable mounts or active alignment. The techniques may be embodied, for instance, in a jig designed for operatively coupling to a given optical bench. The jig includes cut-outs that identify placement locations for the various optical components on the underlying optical bench. Thus, once the jig is secured to the optical bench, precise placement of the optical components is simplified. In some such embodiments, the jig further includes a clamping assembly for each cut-out, so that once an optical component is placed on the optical bench via that cutout, the clamping assembly can be engaged to hold that optical component in place while a deposited bonding agent is cured.

20 Claims, 7 Drawing Sheets

(56) References Cited

U.S. PATENT DOCUMENTS

| | | | |
|---|---|---|---|
| 7,395,606 B2* | 7/2008 | Crampton | 33/503 |
| 7,591,078 B2* | 9/2009 | Crampton | 33/503 |
| 7,936,657 B2* | 5/2011 | Fujita et al. | 369/103 |
| 2004/0103421 A1 | 5/2004 | Nakata et al. | |
| 2005/0030648 A1 | 2/2005 | Yamaguchi et al. | |
| 2009/0285059 A1 | 11/2009 | Fujita et al. | |

\* cited by examiner

RAPID OPTICAL ASSEMBLY VIA SIMULTANEOUS PASSIVE BONDING

RELATED APPLICATION

This application claims the benefit of and priority to U.S. Provisional Application No. 61/481,053, filed on Apr. 29, 2011, which is herein incorporated by reference in its entirety.

FIELD OF THE DISCLOSURE

The invention relates to methods and devices for fabricating optical instrumentation.

BACKGROUND

Various assembly methods such as those using adjustable and modular mounts for optical components and pick-and-place assembly are utilized to fabricate optical instruments.

SUMMARY

One embodiment of the present invention provides a system for fabricating an optical bench. The system includes a jig configured for temporarily coupling with an optical bench to be populated with one or more optical components, the jig having one or more shaped apertures in its surface so as to designate a predetermined placement location of a corresponding optical component on to the optical bench. In some cases, at least one of the shaped apertures is associated with a clamp for securely positioning a corresponding optical component at its predetermined position on the optical bench. In some cases, the jig is configured to allow a plurality of optical components to be simultaneously bonded to the optical bench. In some cases, each of the apertures is configured with a plurality of alignment bumps. In some such cases, each of the apertures is configured with three alignment bumps arranged in an orthogonal relationship. In some cases, each of the optical bench and jig is associated with an X-Y coordinate system, and the jig is configured to temporarily couple with the optical bench so that the X-Y coordinate system of the jig is aligned with the X-Y-Z coordinate system of the optical bench. In other cases, each of the optical bench and jig is associated with an X-Y-Z coordinate system, and the jig is configured to temporarily couple with the optical bench so that the X-Y-Z coordinate system of the jig is aligned with the X-Y-Z coordinate system of the optical bench. In some cases, the jig is further configured with one or more support posts configured for engaging a corresponding contact pad of the optical bench. In some cases, the jig is further configured with one or more optical bench clamps configured for securing the optical bench. In some cases, the jig is configured with a plurality of contact points configured to interface with corresponding contact points on the optical bench. In some cases, the jig is configured with a major recessed area that is shaped to receive the optical bench. In some such cases, a perimeter of the recessed area includes a plurality of contact points each configured to interface with corresponding contact point on the optical bench. Numerous variations will be apparent in light of this disclosure. For instance, another embodiment provides a method of fabricating an optical bench, the method comprising use of the jig as variously defined in this paragraph to fabricate the optical bench.

Another embodiment of the present invention provides a system for fabricating an optical bench. In this example case, the system includes a jig configured for temporarily coupling with an optical bench to be populated with one or more optical components, the jig having one or more shaped apertures in its surface so as to designate a predetermined placement location of a corresponding optical component on to the optical bench, wherein each of the apertures is configured with a plurality of alignment bumps, and wherein the jig is further configured with a plurality of contact points configured to interface with corresponding contact points on the optical bench. The system further includes a clamp associated with each aperture and for securely positioning a corresponding optical component at its predetermined position on the optical bench. Each of the optical bench and jig is associated with an X-Y-Z, coordinate system, and the jig is configured to temporarily couple with the optical bench so that the X-Y-Z coordinate system of the jig is aligned with the X-Y-Z coordinate system of the optical bench. In some cases, the jig is configured to allow a plurality of optical components to be simultaneously bonded to the optical bench. In some cases, each of the apertures is configured with three alignment bumps arranged in an orthogonal relationship. In some cases, the jig is further configured with one or more support posts configured for engaging a corresponding contact pad of the optical bench, in some cases, the jig is further configured with one or more optical bench clamps configured for securing the optical bench.

Another embodiment of the present invention provides a system for fabricating an optical bench. In this example case, the system includes a jig configured for temporarily coupling with an optical bench to be populated with one or more optical components, the jig having one or more shaped apertures in its surface so as to designate a predetermined placement location of a corresponding optical component on to the optical bench. Each of the apertures is configured with a plurality of alignment bumps. The jig is further configured with a major recessed area that is shaped to receive the optical bench, and a perimeter of the recessed area includes a plurality of contact points each configured to interface with corresponding contact point on the optical bench. The system further includes a clamp associated with each aperture and for securely positioning a corresponding optical component at its predetermined position on the optical bench. Each of the optical bench and jig are associated with an X-Y-Z coordinate system, and the jig is configured to temporarily couple with the optical bench so that the X-Y-Z coordinate system of the jig is aligned with the X-Y-Z coordinate system of the optical bench. Another embodiment provides a method that includes use of the jig as variously described in this paragraph to fabricate the optical bench.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1A:
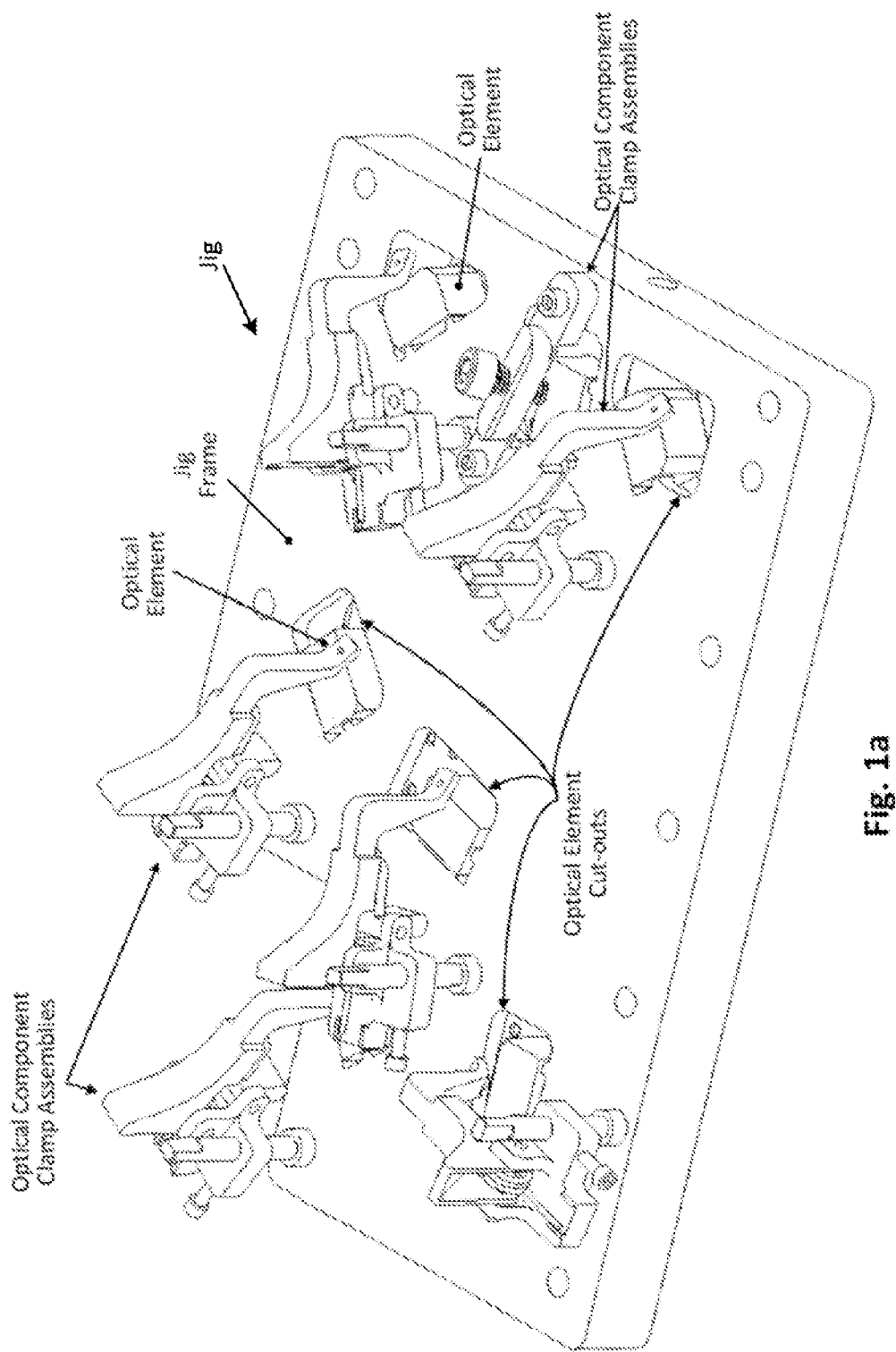
FIGS. 1a-1c each illustrate top-side perspective view of an optical assembly system for a given optical bench design, configured in accordance with an embodiment of the present invention.

Techniques are disclosed, for fabricating optical instrumentation. The techniques can be used, for instance, to populate an optical bench with several optics that can be simultaneously bonded and then simultaneously verified to very precise assembly, without the use of adjustable mounts or active alignment. In some such embodiments, the techniques are embodied in a jig that is designed for operatively coupling to a given optical bench. The jig includes cut-outs that identify precise placement locations for the various optical components on the underlying optical bench. Thus, once the jig is secured to the optical bench, precise placement of the optical components is greatly simplified. In some such embodiments, the jig further includes a clamping assembly for each cut-out, so that once an optical component is placed on the optical bench in that cut-out, the clamping assembly can be engaged to hold that optical component in place while the underlying bonding agent (e.g., epoxy or other adhesive) disposed between the component and the optical bench is cured.

General Overview

As previously explained, optical instrumentation can be manufactured using various methods that typically include adjustable mounts or pick-and-place machines that rely on computer vision for proper positioning. However, there are number of non trivial problems associated with such methods and manufacturing systems. For instance, fabricating, assembling, and integrating complex optical instruments using adjustable mounts throughout the optical train can be costly and slow. Modular components such as optics holders on rails are available, but are generally designed for a laboratory environment; and not for the rigors of demanding environments such as those associated with flight-based applications susceptible to extreme temperature variations and/or vibration profiles. Nor are such modular component holding solutions always suitable for a given set of packaging requirements. In still other cases, typically with respect to less complex optical devices such as small designator lasers having only a few optical elements and which are built using so-called "active alignment" of glass-to-metal with no mounts, optical instrumentation is required to monitor the position of the optic as it is manually aligned using precision motion equipment. Pick-and-place assembly also uses active alignment and can require large capital expenditures for automated assembly computer vision machines and software, as well as for the associated maintenance costs. In addition, pick-and-place methods can be slow, unless many replications of the very expensive machines are put into service. For a complex, expensive product that might only see production of for instance, 1000 units or less, recovery of such capital expenditures is doubtful or simply not attainable. In short, such fabrication procedures use active alignment to slowly place each optic into position, then verify, then bond, then re-verify.

Thus, and in accordance with an embodiment of the present invention, a system for manufacturing an optical instrument is provided. The system includes a jig that is mechanically customized to a given optical bench design. The jig operatively couples to the optical bench in a specific manner, and includes cut-outs that identify precise placement locations for the various optical components on the underlying optical bench. Thus, once the jig is secured to the optical bench, precise placement of the optical components is enabled.

In some such embodiments, the jig further includes a clamping assembly for each cut-out, so that once an optical component is placed on the optical bench in that cut-out, the clamping assembly can be engaged to hold that optical component in place while the underlying epoxy or other bonding agent disposed between the component and the optical bench is cured. Given that multiple components of the optical train can be relatively quickly placed and secured, the bonding process of each component can effectively take place simultaneously. Likewise, once the optical components are placed, the beam propagation path can be quickly verified to ensure proper alignment is met prior to completion of the curing process.

In some embodiments, the techniques provided herein can be used, for instance, to replace one or more adjustable mounts in a given optical bench design, especially those that form the framework of the optical path from input to output, with precisely but passively located and fixed optical elements that are similar in shape and precision to alignment cubes. In some embodiments, the optical elements are uniform in size and shape and/or are otherwise configured with highly orthogonal sides. As will be further appreciated in light of this disclosure, the techniques provided herein enable the use of a substantially flat optical bench (no upward protruding features whatsoever, such as mounting features). As such, the optical bench can be can be smaller in area because mounts can be eliminated or otherwise reduced, as well as lighter because it is smaller, and thinner because it is lighter. The relatively inexpensive jig can be used to locate all (or a subset) of the optical elements that form the framework of the optical path, and further enables simultaneously bonding of these optical elements into place onto the optical bench using a given adhesive and bond geometry.

The jig further enables fast and efficient verification of the location of the planes and surfaces of each optic. In some embodiments, this verification can be carried out using a commonly available coordinate measuring machine (CMM), but the claimed invention is not intended to be limited to use of such equipment. Numerous other verification processes will be apparent in light of this disclosure (e.g., visible beam based verification such as a green beam that demonstrates the optical train is functional for its intended purpose; detector based verification where a beam is propagated through the optical train from an input to an output monitored by a detector).

In any such cases, the jig can be used to allow a substantial portion of the optical bench assembly process to be performed in a matter of minutes instead of days or even weeks, including the verification process. In addition, the populated optical elements can be aligned to a very high degree (approaching perfectly aligned in some embodiments), making the rest of the alignment task significantly easier, and leading to fewer incidents of damage to misalignments as the build progresses. In some such embodiments, a CMM output of optical surface locations and orientations serves as a useful record of minor initial misalignments, should they cause more misalignment down the optical path. Because the jig can be implemented in a relatively inexpensive fashion (e.g., two or three orders of magnitude less than a pick-and-place machine, for instance), a large number can be put into service simultaneously and at a reasonable cost. Also, simultaneous passive bonding followed by simultaneous CMM inspection in accordance with some embodiments is very fast compared to, for example, pick-and-place active alignment and verification, as will be appreciated. In accordance with one embodiment of the present invention, the CMM inspection process involves contacting the CMM probe tip on multiple locations of the optical bench and each optical element populated thereon and recording the position (X-Y coordinates) of the probe tip at each of those locations. In one such case, the probe tip is contacted on three locations of a first side of each optical element on three locations of a second side of each optical element, wherein the first probed side and the second probed side are orthogonal to each other. The three locations of each side may correspond, for example, to three of the four corners of that side. The CMM software converts the measured probe coordinates into the coordinate system of the optical bench assembly, thereby allowing for confirmation of the build.

Jig Assembly

Figure 1B:
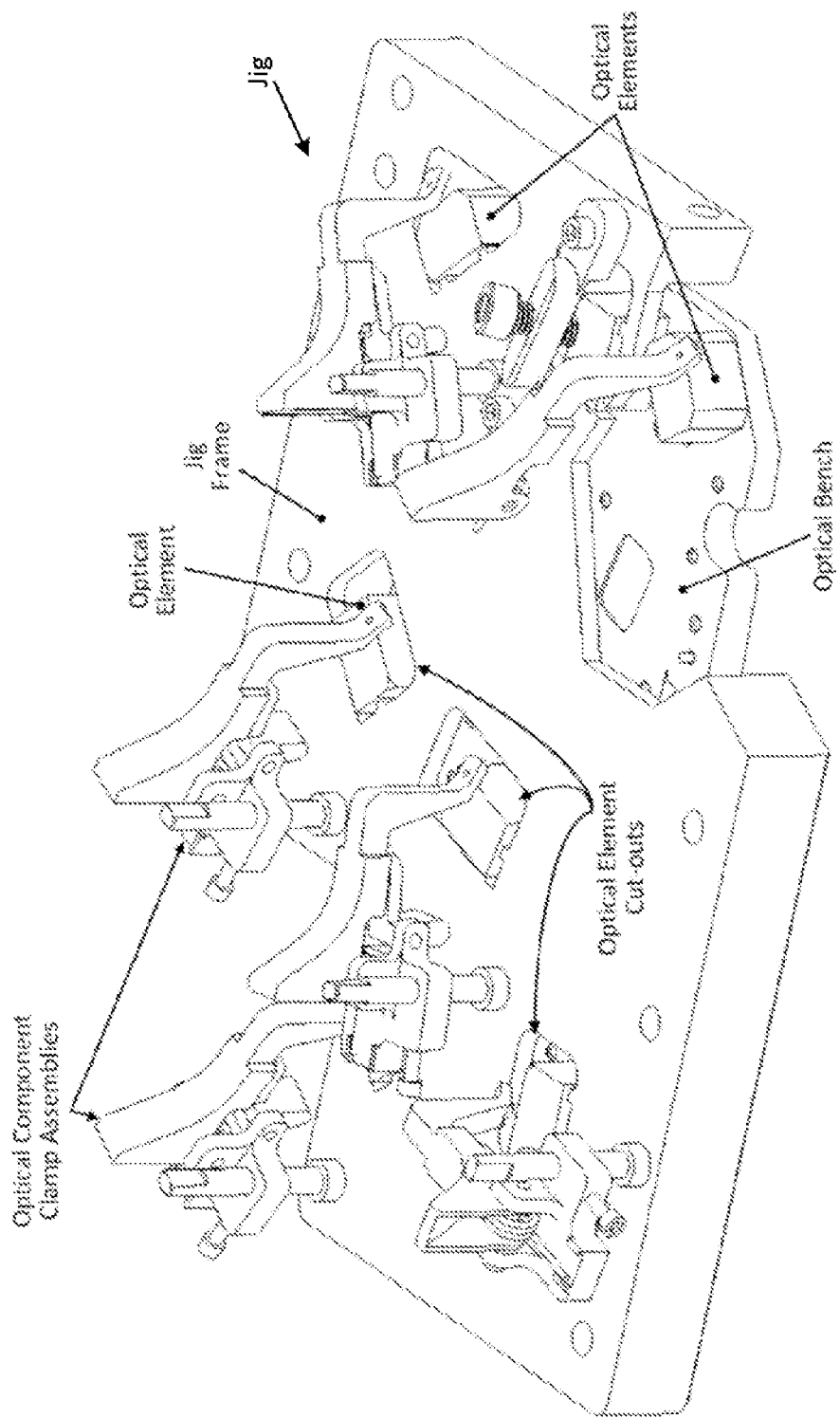
Figure 1C:
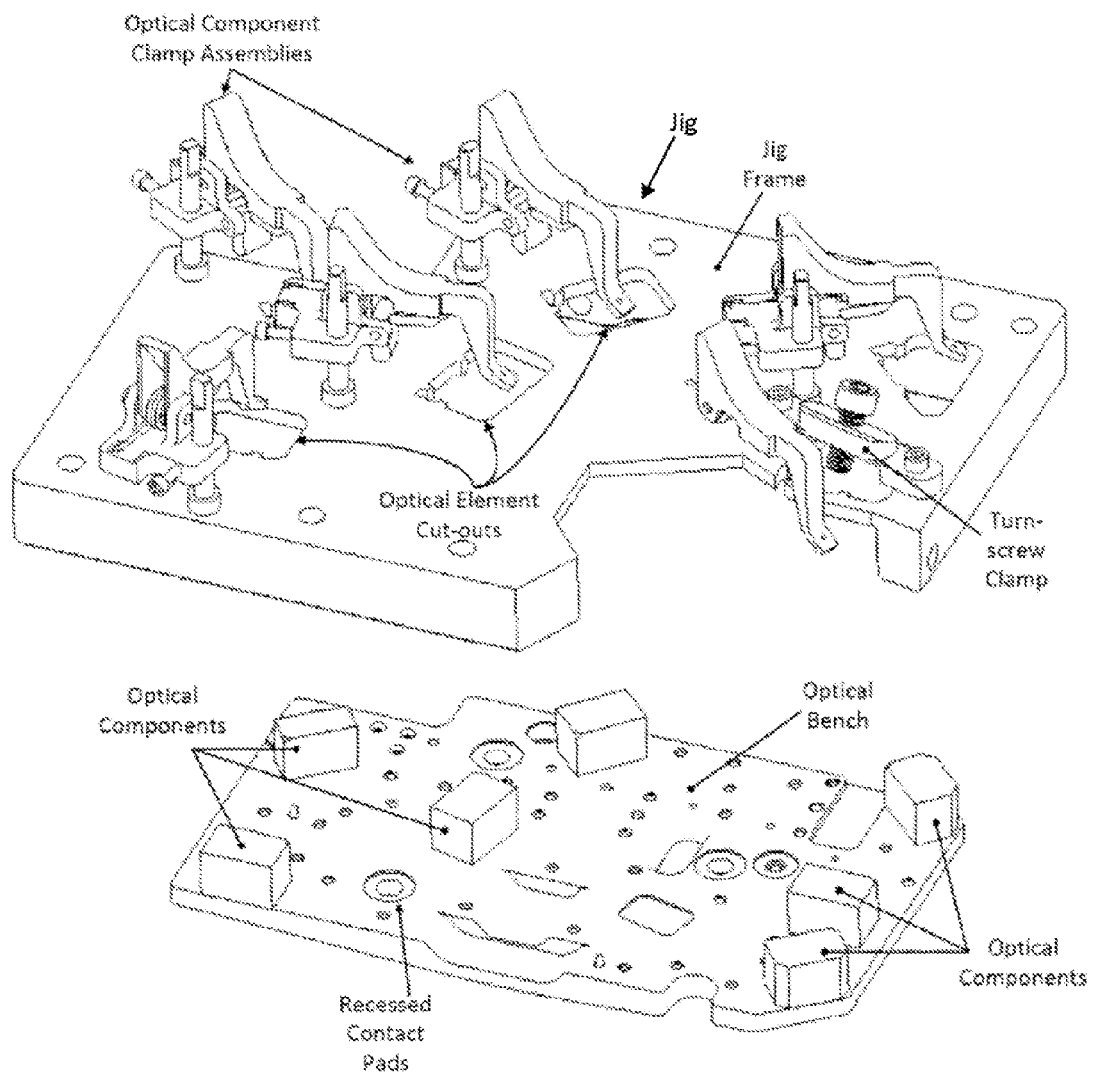

FIGS. 1a-1c each illustrates a top-side perspective view of an optical assembly system, configured in accordance with an embodiment of the present invention. As can be seen, the system includes a jig mechanically customized to couple with a given optical bench. The jig includes a frame supporting a number of optical component clamp assemblies. The jig frame further includes a number of optical element cut-outs configured with alignment bumps (the alignment bumps are further illustrated in FIGS. 2a and 3a-b and will be discussed in turn).

As will be appreciated, the optical bench and optical components populated thereon are shown in FIGS. 1a-1c, but are not part of the jig-based optical assembly system, per se; rather, it is shown to provide an example of how the jig assembly can be operatively coupled with the bench. FIG. 1a shows the jig-based assembly system mounted on the optical bench, FIG. 1b shows a cut-away view to better show the underlying optical bench once installed into the jig assembly, and FIG. 1c shows the jig-system separated from the populated optical bench. Note the recessed contact pads shown on the optical bench in FIG. 1c. As will be explained in turn, those pads can be provisioned on the optical bench, so as to interface with corresponding bench support posts of the jig assembly.

The jig-assembly can be made out of any suitable material, such as aluminum, steel, or a pressure molded plastic. It is specifically designed and configured to op rate with a given optical bench design, and the specific configuration will vary from one application to the next, as will be appreciated in light of this disclosure. Thus, for example, the number and dimensions of the optical element cat-outs will vary, as will the overall dimension and shape of the jig frame perimeter.

In the example embodiment shown, most of the optical component clamping assemblies are implemented as spring-loaded clamps that are operatively coupled to a corresponding clamp support post bolted or otherwise fastened to the jig frame. Thus, the spring-loaded clamps can rotate about the post, and can be adjusted up or down the post as well. One of the optical component clamping assemblies is configured as a turn-screw clamp. The clamping assemblies can be implemented with any number of suitable materials, such as steel, aluminum, or plastic, or a combination of such materials. Any number of suitable clamping configurations and materials can be used, whether spring-based or otherwise, so long as the optical component is sufficiently secured to the optical bench according to a given specification.

Figure 2A:
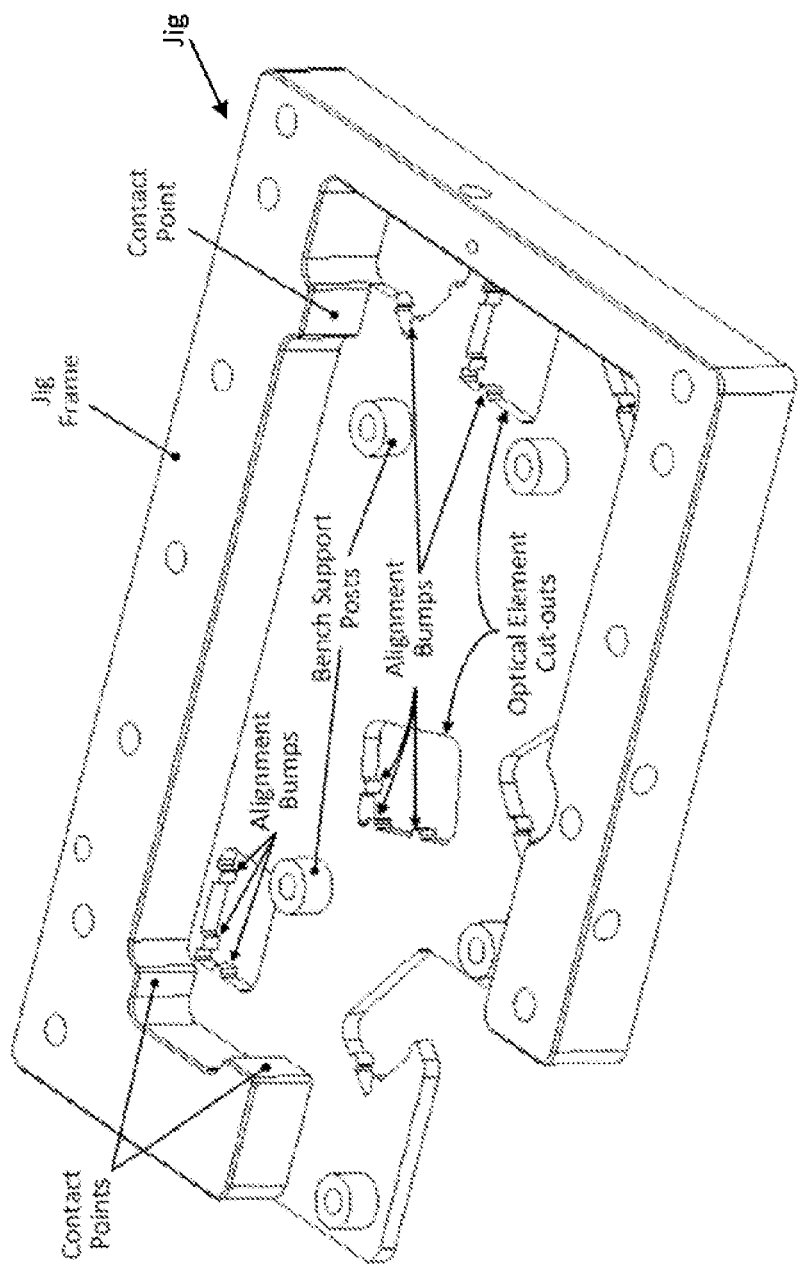
FIGS. 2a-2c each illustrate a bottom-side perspective view of the optical assembly system of FIG. 1a-1c, configured in accordance with an embodiment of the present invention.
Figure 2B:
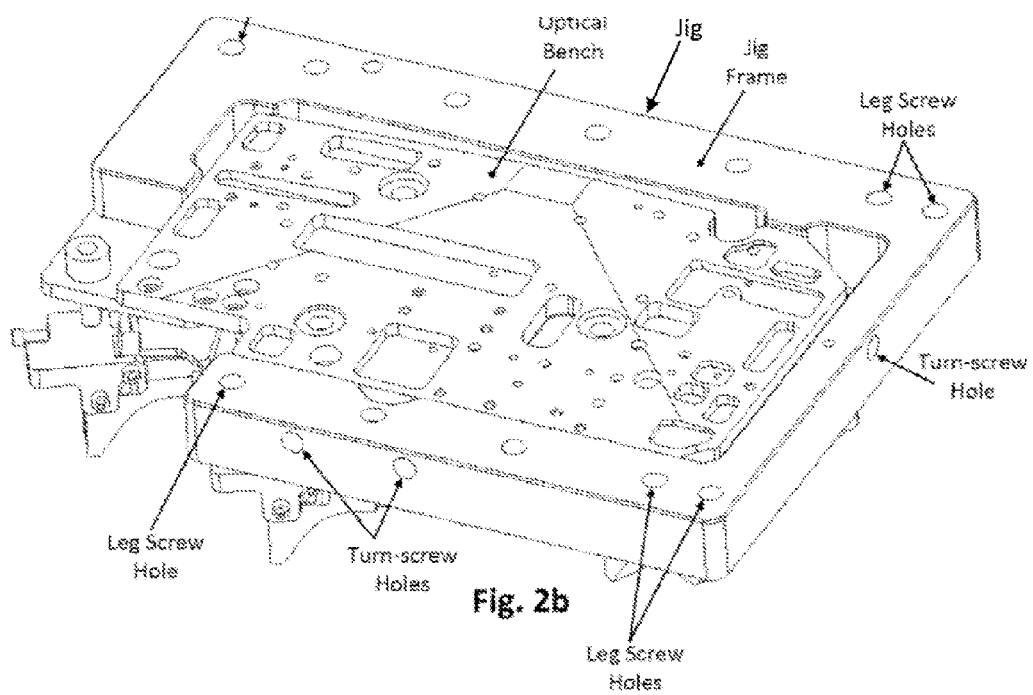
Figure 2C:
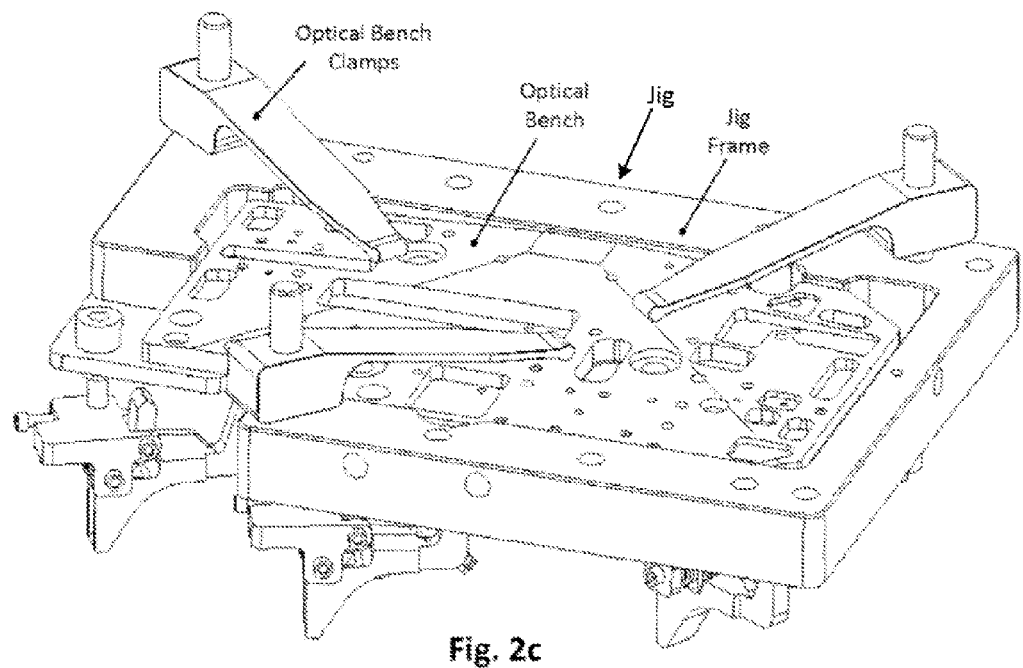

FIGS. 2a-2c each illustrate a bottom-side perspective view of the optical assembly system of FIGS. 1a-1c, configured in accordance with an embodiment of the present invention. FIG. 2a shows the jig frame without the optical bench installed, so the various features can be better seen. As can be seen, the underside of jig frame in this example embodiment is configured with a major recessed area that is effectively shaped to receive the optical bench to be populated. The perimeter of the recessed area includes a number of contact points. In this example embodiment, there are three contact points shown along the inner perimeter of the jig frame (recess sidewalls). These contact points are configured to interface with corresponding contact points on the optical bench perimeter, such that when all three sets of contact points are properly seated, the X-Y coordinate system of the jig assembly is sufficiently aligned with the X-Y coordinate system of the optical bench.

To further assist in the coupling-alignment process between the jig assembly and the optical bench to be populated, the jig assembly can be further configured with a number of bench support posts, as shown in the example embodiment of FIG. 2a. As will be appreciated, these bench support posts are configured to be received by the recessed contact pads of the optical bench, which are best shown in FIG. 1c. In this example embodiment, three recessed contact pads are visible on the optical bench, but others may be hidden from view. Other embodiments may have fewer or no such support post/recessed contact pad features, while other embodiments may have a greater number, depending on factors such as the desired degree of alignment as well as the size and complexity of the optical bench design.

As can be further seen in FIG. 2a, each of the optical element cut-outs includes a set of alignment bumps. Each set in this example embodiment includes three bumps configured in an orthogonal relationship (e.g., 2 bumps on one side, and a third bump on another side orthogonal to the 2-bump side). In a more general sense, the alignment bumps align the optical elements to the bench datums and to each other. As will be appreciated in light of this disclosure, the alignment bumps are configured to interface with corresponding side surfaces of the optical component associated with that particular position on the optical bench, such that when the optical element is properly seated against all three alignment bumps, that optical element is properly placed on the optical bench. In a more general sense, the alignment bumps align, the optical elements to the bench datums and to each other. In this sense, recall that the X-Y coordinate system of the jig assembly is aligned with the X-Y coordinate system of the optical bench.

In other embodiments, note that the jig frame may not include a major recess like, the one shown in FIG. 2a. For instance, the underside of the jig frame may be substantially flat in some embodiments. In some such cases, for example, the jig assembly and optical bench can be configured such that, when the optical bench is laid on a flat surface (e.g., floor or work table surface), the jig assembly can be laid over the optical bench and pushed onto or otherwise positioned into place so that the various contact points and aligning features engage, thereby sufficiently aligning the X-Y-Z coordinate system of the jig assembly with the X-Y-Z coordinate system of the optical bench. In these particular cases, the alignment in the Z-axis comes by virtue of the common flat surface upon which the jig assembly and optical bench rest, and the alignment in the X-axis and Y-axis comes by virtue of the contact points and any bench support post/recess features. In still other embodiments, each of three or more optical bench contact points of the jig assembly may further include a ledge portion upon which the optical bench may be effectively slid onto and rested upon, so that no underlying surface (table, workbench, etc) is required. In these particular cases, the alignment in the Z-axis comes by virtue of the ledge portions of the jig assembly upon which optical bench rests, and the alignment in the X-axis and Y-axis comes by virtue of the contact points and any bench support post/recess features. As will be appreciated in light of this disclosure, the bench support post/recess features can also be used to facilitate alignment in the Z-axis, in embodiments where such features are included (e.g., where the bench support posts can be lapped to a specific height to provide a desired Z-offset).

In any such embodiments, one or more turn-screws can be threaded into the turn-screw holes residing in opposing sides of the jig frame, so that the end of the turn-screw contacts or otherwise engages a corresponding side of the optical bench and effectively secures the optical bench up against the opposing contact point(s). In some such embodiments, the turn-screw ends can be coated with hardened rubber to prevent scratching, or gauging of the optical bench perimeter, if so desired.

As will be further appreciated, the number of contact points can vary, and other embodiments may include fewer such points (e.g., two contact points) or more such points (e.g., six contact points). The number of contact points will depend on factors such as the available area that can be dedicated to such contact points on the optical bench, the perimeter shape of the optical bench, and the desired degree of coordinate system alignment (in general, the greater the number of contact points, the greater the degree of alignment of the jig and bench coordinate systems).

FIG. 2b shows a bottom-side perspective view of the optical bench installed into the jig frame, in accordance with an embodiment of the present invention. Note that in some such embodiments, the optical bench fits snugly into the jig frame recess and no further holding mechanism is necessary. In other embodiments, one or more turn-screws can be used to secure the optical bench into the jig frame. Some example threaded turn-screw holes are shown in FIG. 2b. FIG. 2b also shows some example threaded leg screw holes, which can be used to receive a threaded leg. Three or four such legs could be used, for instance, to raise the jig assembly off the floor and to accommodate any fixturing or other such features on the underside of the jig assembly. For example, FIG. 2c shows a number of optical bench clamps secured into the jig frame and spring loaded again the installed optical bench, so as to secure the optical bench in place during population and bonding of the optical elements.

Once the optical bench is secured in place within the jig frame, the various optical components can then be populated onto the bench. An optical element may be, for example, a lens, prism, window, beam splitter, or other element that is used in an optical instrument or application. As will be further appreciated, an optical bench may be prepared with a single type of optical element or with a combination of different types of optical elements. In general, selection of optics and their positions will be determined based on the application of the optical instrument being manufactured. In some specific embodiments, fixed optical elements that are similar in shape and precision to alignment cubes are used. However, any optical element shape that is amenable to being populated directly on the optical bench can be used, and the claimed invention is not intended to be limited to cube-shaped optical elements. As will be appreciated in light of this disclosure, using a substantially uniform optical element shape and size profile for the optical components to be populated on the optical bench is helpful in simplifying the fabrication process, particularly when the optical elements have highly orthogonal sides. Thus, and in accordance with some embodiments of the present invention, 90% or more of the optics to be populated using the jig are the same size and shape, within a given acceptable tolerance. In still other embodiments, all of the optics to be populated using the jig are the same size and shape, within a given acceptable tolerance.

In some embodiments, an adhesive may be positioned at one or more locations on the optical bench for each predetermined location for a given one of the optical elements, prior to placement of the corresponding optical element. Note, however, that adhesive may be positioned on an optical bench surface or may be positioned onto an optical element itself or on both the optical bench and optical element. If positioned on the optical bench, adhesive may be positioned in specific predetermined optical element attachment locations on the optical bench. For instance, in one example embodiment, three dots of epoxy are deposited for each optical element, such that when the optical component is secured in position, the corresponding optical component clamp assembly applies a force having a vector that generally passes on an angle through the optical element and a center of the three dots of epoxy. The force vector is sufficient to secure the element against the alignment bumps in the cut-out.

Various adhesives may be used to attach an optical element to the given optical bench, including any number of suitable epoxies, glues, bonding materials, and any suitable means to adhere an optical element to an optical bench. An adhesive may be rapid drying, rapid curing adhesive. An adhesive may be a synthetic or a natural adhesive, or a combination thereof. In some embodiments, the bonding agent is an adhesive that cures by evaporating a solvent or by a chemical reaction that occurs between two or more constituents of the adhesive. The adhesive may be, for instance, heat cured, air-cured, or ultraviolet (UV) cured. In some specific example cases, the adhesive includes a uniform particulate (e.g., glass or plastic beads) that enable a self-shimming glue line, as will be appreciated.

Figure 3A:
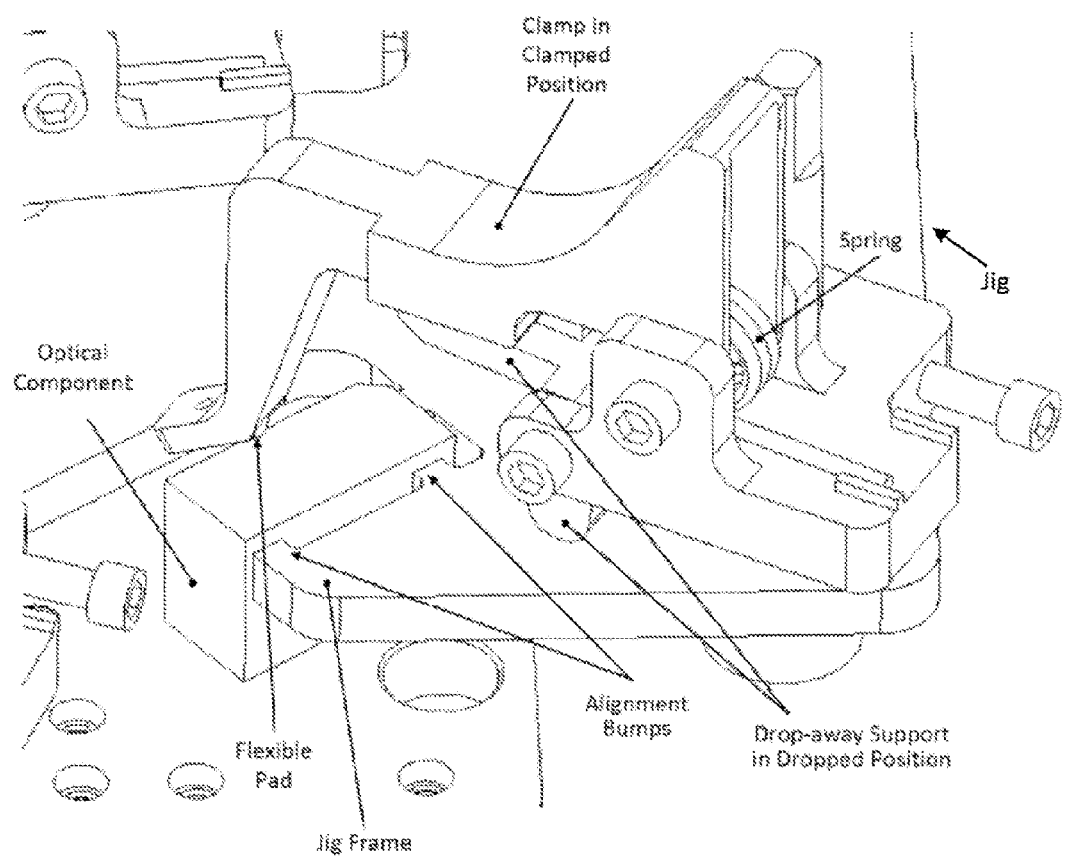
FIGS. 3a-3b each illustrate a detailed partial perspective view of the optical assembly system of FIGS. 1a-1c, configured in accordance with an embodiment of the present invention.
Figure 3B:
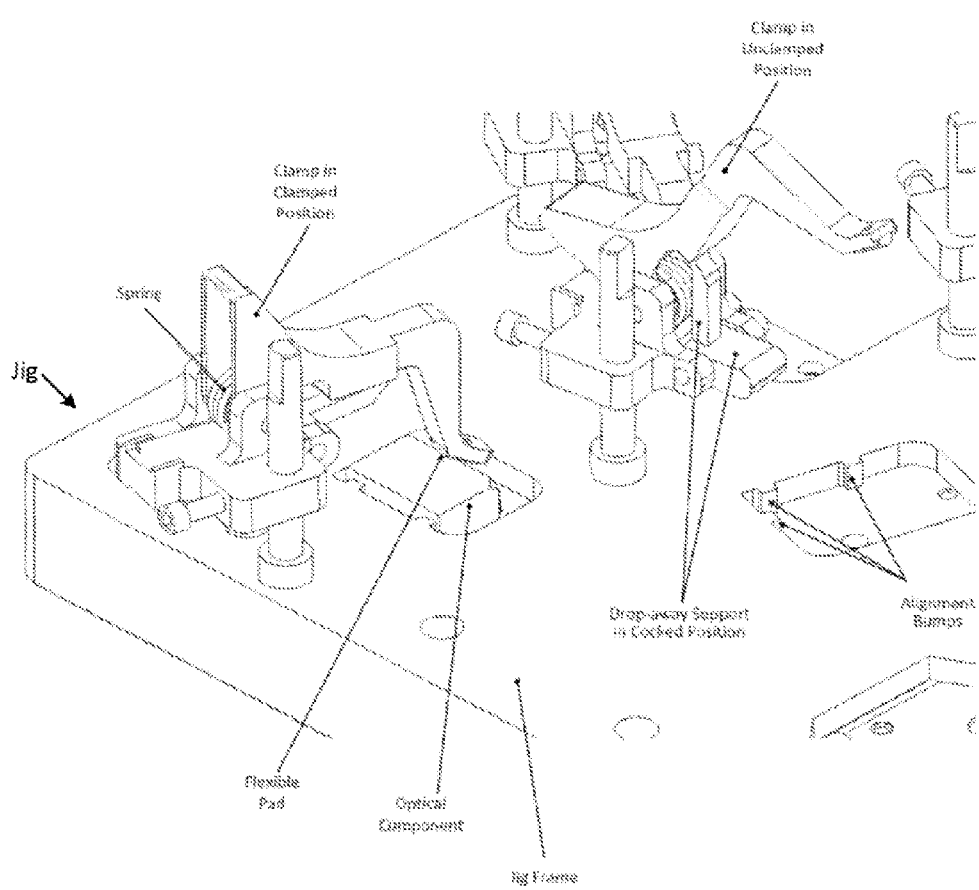

FIGS. 3a-3b each illustrate a detailed partial perspective view of an example optical assembly system, configured in accordance with an embodiment of the present invention. As can be seen, the clamp is shown in the clamped position in FIG. 3a, thereby securing the optical element in place within the optical component cut-out and up against the alignment bumps. A flexible pad can be provisioned on the end of the clamp that applies the load to the optical element.

As can be further seen, the clamp assembly includes a drop-away support. FIG. 3a shows the drop-away support in the dropped position. In operation, pulling back on the clamp lets that support drop-away, then the clamp is released thus applying pressure to the optic, with the force vector causing all six degrees to freedom to be constrained only once. FIG. 3b shows a claim in the unclamped position, with the drop-away support in the cocked position. In operation, the spring loaded clamp is held high above optic cavity until released with one hand, for instance, while the other hand positions the optical element. In some embodiments, note that a hand-held vacuum chuck can be used to move or otherwise position the optic.

The foregoing description of the embodiments of the invention has been presented for the purposes of illustration and description. It is not intended to be exhaustive or to limit the invention to the precise form disclosed. Many modifications and variations are possible in light of this disclosure. For instance, note that once the jig is operatively coupled to the optical bench, automatic placement can be carried out, for instance, using robotics or other pick and place technology, if so desired. It is intended that the scope of the invention be limited not by this detailed description, but rather by the claims appended hereto.

What is claimed is:
1. A system for fabricating an optical bench assembly, the system comprising:

a jig configured for temporarily coupling with an optical bench to be populated with one or more optical components, the jig having one or more shaped apertures in its surface so as to designate a predetermined placement location of a corresponding optical component on to the optical bench.

2. The system of claim 1 wherein at least one of the shaped apertures is associated with a clamp for securely positioning a corresponding optical component at its predetermined position on the optical bench.

3. The system of claim 1 wherein the jig is configured to allow a plurality of optical components to be simultaneously bonded to the optical bench.

4. The system of claim 1 wherein each of the apertures is configured with a plurality of alignment bumps.

5. The system of claim 4 wherein each of the apertures is configured with three alignment bumps arranged in an orthogonal relationship.

6. The system of claim 1 wherein each of the optical bench and jig is associated with an X-Y coordinate system, and the jig is configured to temporarily couple with the optical bench so that the X-Y coordinate system of the jig is aligned with the X-Y-Z coordinate system of the optical bench.

7. The system of claim 1 wherein each of the optical bench and jig is associated with an X-Y-Z coordinate system, and the jig is configured to temporarily couple with the optical bench so that the X-Y-Z coordinate system of the jig is aligned with the X-Y-Z coordinate system of the optical bench.

8. The system of claim 1 wherein the jig is further configured with one or more support posts configured for engaging a corresponding contact pad of the optical bench.

9. The system of claim 1 wherein the jig is further configured with one or more optical bench clamps configured for securing the optical bench.

10. The system of claim 1 wherein the jig is configured with a plurality of contact points configured to interface with corresponding contact points on the optical bench.

11. The system of claim 1 wherein the jig is configured with a major recessed area that is shaped to receive the optical bench.

12. The system of claim 11 wherein a perimeter of the recessed area includes a plurality of contact points each configured to interface with corresponding contact point on the optical bench.

13. A method of fabricating an optical bench, the method comprising use of the jig of claim 1 to fabricate the optical bench.

14. A system for fabricating an optical bench assembly, the system comprising:
a jig configured for temporarily coupling with an optical bench to be populated with one or more optical components, the jig having one or more shaped apertures in its surface so as to designate a predetermined placement location of a corresponding optical component on to the optical bench, wherein each of the apertures is configured with a plurality of alignment bumps, and wherein the jig is further configured with a plurality of contact points configured to interface with corresponding contact points on the optical bench; and
a clamp associated with each aperture and for securely positioning a corresponding optical component at its predetermined position on the optical bench;
wherein each of the optical bench and jig is associated with an X-Y-Z coordinate system, and the jig is configured to temporarily couple with the optical bench so that the X-Y-Z coordinate system of the jig is aligned with the X-Y-Z coordinate system of the optical bench.

15. The system of claim 14 wherein the jig is configured to allow a plurality of optical components to be simultaneously bonded to the optical bench.

16. The system of claim 14 wherein each of the apertures is configured with three alignment bumps arranged in an orthogonal relationship.

17. The system of claim 14 wherein the jig is further configured with one or more support posts configured for engaging a corresponding contact pad of the optical bench.

18. The system of claim 14 wherein the jig is further configured with one or more optical bench clamps configured for securing the optical bench.

19. A system for fabricating an optical bench assembly, the system comprising:
a jig configured for temporarily coupling with an optical bench to be populated with one or more optical components, the jig having one or more shaped apertures in its surface so as to designate a predetermined placement location of a corresponding optical component on to the optical bench, wherein each of the apertures is configured with a plurality of alignment bumps, and wherein the jig is further configured with a major recessed area that is shaped to receive the optical bench, and a perimeter of the recessed area includes a plurality of contact points each configured to interface with corresponding contact point on the optical bench; and
a clamp associated with each aperture and for securely positioning a corresponding optical component at its predetermined position on the optical bench;
wherein each of the optical bench and jig is associated with an X-Y-Z coordinate system, and the jig is configured to temporarily couple with the optical bench so that the X-Y-Z coordinate system of the jig is aligned with the X-Y-Z coordinate system of the optical bench.

20. A method comprising use of the jig of claim 19 to fabricate the optical bench.

* * * * *